J. VANDERCAR.
Faucets.
No. 154,814. Patented Sept. 8, 1874.
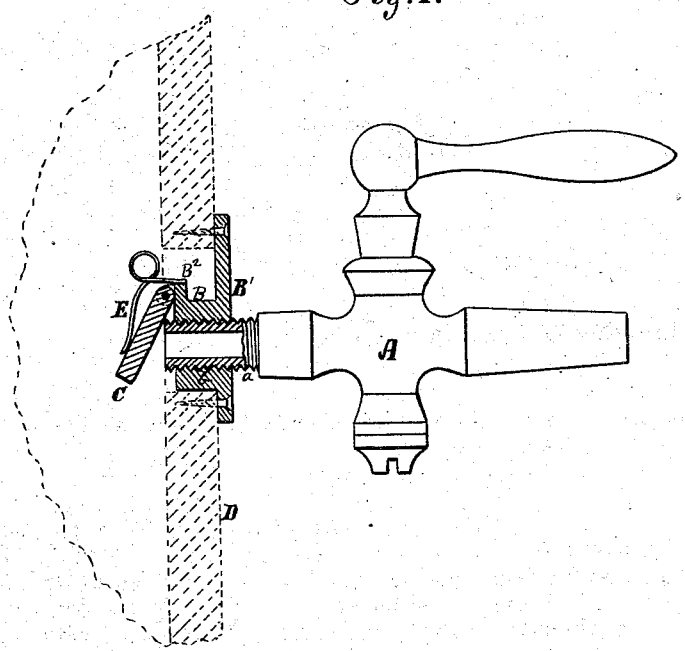
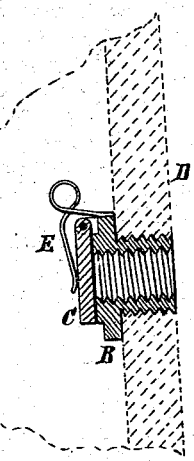
WITNESSES:
INVENTOR:
J. Vandercar
BY
ATTORNEYS.

UNITED STATES PATENT OFFICE.

JOHN VANDERCAR, OF BROOKLYN, NEW YORK.

IMPROVEMENT IN FAUCETS.

Specification forming part of Letters Patent No. 154,814, dated September 8, 1874; application filed January 31, 1874.

*To all whom it may concern:*

Be it known that I, JOHN VANDERCAR, of Brooklyn, in the county of Kings and State of New York, have invented a new and useful Improvement in Faucet-Valves, of which the following is a specification:

The invention will first be fully described, and then pointed out in the claim.

Figures 1 and 2 are side elevations, the first partly and the second wholly in section.

A represents a faucet, provided with the end screw $a$, which is longer than the female thread $b$ of the nut B. The latter has a flange, $B^1$, by which it is fastened to the outside of barrel-head D, and an inside flange, $B^2$, to which is hinged the valve C, and attached its closing-spring E. This construction allows the channel in cock A to be automatically closed whenever the cock A is screwed outwardly a short distance, and the channel through nut B to be closed whenever the cock is withdrawn entirely. On the other hand, a single revolution of the cock will suffice to open the previously-shut valve E, so that the liquid can flow freely from the barrel.

Having thus described my invention, what I claim as new, and desire to secure by Letters Patent, is—

The combination of nut B with a spring-pressed valve, C, hinged thereto, and the cock-screw $a$, made longer than the female nut-thread $b$, as and for the purpose described.

JOHN VANDERCAR.

Witnesses:
T. B. MOSHER,
ALEX. F. ROBERTS.